United States Patent [19]

Gay et al.

[11] Patent Number: 5,650,053

[45] Date of Patent: Jul. 22, 1997

[54] ELECTROREFINING CELL WITH PARALLEL ELECTRODE/CONCENTRIC CYLINDER CATHODE

[75] Inventors: Eddie C. Gay, Park Forest; William E. Miller, Naperville; James J. Laidler, Burr Ridge, all of Ill.

[73] Assignee: The United States of America as represented by the United States Department of Energy, Washington, D.C.

[21] Appl. No.: 562,612

[22] Filed: Nov. 24, 1995

[51] Int. Cl.$^6$ .............. C25D 17/00; C25C 3/00; A62D 3/00

[52] U.S. Cl. .............. 204/212; 205/44; 205/46; 205/47; 205/49; 204/272; 204/669; 204/671; 204/243 R; 204/215; 204/227; 204/244; 204/287; 588/201; 423/3

[58] Field of Search .......... 588/20, 201; 976/DIG. 379, 976/DIG. 380, DIG. 266, DIG. 268; 205/44, 46, 47, 49; 204/272, 669, 671, 212, 222, 243 R, 199, 200, 215, 216, 217, 227, 244, 287, 44, 46, 47, 49

[56] References Cited

U.S. PATENT DOCUMENTS

| | | | |
|---|---|---|---|
| 3,282,806 | 11/1966 | Long et al. | 205/44 |
| 4,242,192 | 12/1980 | Dunning, Jr. et al. | 204/212 |
| 4,526,713 | 7/1985 | Chino et al. | 588/20 |
| 4,596,647 | 6/1986 | Miller et al. | |
| 4,855,030 | 8/1989 | Miller | |
| 4,880,506 | 11/1989 | Ackerman et al. | |
| 4,995,948 | 2/1991 | Poa et al. | |
| 5,009,752 | 4/1991 | Tomczuk et al. | 205/44 |
| 5,348,626 | 9/1994 | Miller et al. | |
| 5,356,605 | 10/1994 | Tomczuk et al. | |

OTHER PUBLICATIONS abstract of JP 40-8006 (Nobuo Ando) Apr. 23, 1965.
abstract of NL 8006565 (Central Asian Gas – ASNA Jul. 1, 1982.
Figure 2 of DE 885803 (Karl Sommer Aug. 6, 1953.
abstract of SU 1177402 (G. N. Volotovsk) Sep. 7, 1985.
abstract of DD 0153977 (Kleindienst et al.) Feb. 17, 1982.
abstract of DE 1176373 (Herbert Lechner) Aug. 20, 1964.

*Primary Examiner*—Kathryn L. Gorgos
*Assistant Examiner*—Alex Noguerda
*Attorney, Agent, or Firm*—Hugh W. Glenn; Thomas G. Anderson; William R. Moser

[57] ABSTRACT

A cathode-anode arrangement for use in an electrolytic cell is adapted for electrochemically refining spent nuclear fuel from a nuclear reactor and recovering purified uranium for further treatment and possible recycling as a fresh blanket or core fuel in a nuclear reactor. The arrangement includes a plurality of inner anodic dissolution baskets that are each attached to a respective support rod, are submerged in a molten lithium halide salt, and are rotationally displaced. An inner hollow cylindrical-shaped cathode is concentrically disposed about the inner anodic dissolution baskets. Concentrically disposed about the inner cathode in a spaced manner are a plurality of outer anodic dissolution baskets, while an outer hollow cylindrical-shaped is disposed about the outer anodic dissolution baskets. Uranium is transported from the anode baskets and deposited in a uniform cylindrical shape on the inner and outer cathode cylinders by rotating the anode baskets within the molten lithium halide salt. Scrapers located on each anode basket abrade and remove the spent fuel deposits on the surfaces of the inner and outer cathode cylinders, with the spent fuel falling to the bottom of the cell for removal. Cell resistance is reduced and uranium deposition rate enhanced by increasing the electrode area and reducing the anode-cathode spacing. Collection efficiency is enhanced by trapping and recovery of uranium dendrites scrapped off of the cylindrical cathodes which may be greater in number than two.

14 Claims, 8 Drawing Sheets

ELECTROREFINING CELL WITH PARALLEL ELECTRODE/CONCENTRIC CYLINDER CATHODE

CONTRACTUAL ORIGIN OF THE INVENTION

The United States Government has rights in this invention pursuant to Contract No. W-31-109-ENG-38 between the U.S. Department of Energy (DOE) and the University of Chicago representing Argonne National Laboratory.

FIELD OF THE INVENTION

This invention relates to the electrochemical refining of spent nuclear fuel from a nuclear reactor and is particularly directed to an electrode arrangement in an electrorefiner cell employing concentric arrays of alternating anodes in the form of dissolution baskets and cathodes in the form of elongated cylinders.

BACKGROUND OF THE INVENTION

This invention relates to a process and apparatus for electrochemically refining spent nuclear fuel from a nuclear reactor and recovering purified uranium and a mixture of uranium and plutonium for use as fresh blanket and core fuel in a nuclear reactor. The invention further relates to an electrorefiner of the type wherein spent blanket and core fuel is refined in a single electrorefining cell by transferring uranium and plutonium from the spent fuel optionally to a molten cadmium pool or directly to an electrolyte and thereafter electrolytically depositing purified uranium on a solid cathode and subsequentially electrolytically depositing a mixture of uranium and plutonium on a second liquid metal cathode, preferably of cadmium.

Electrorefining processes have been generally used to recover high purity metal or metals from impure feed materials and more particularly to recover materials such as uranium and plutonium from spent nuclear fuel. Electrorefining of spent nuclear fuel is carried out in an electrolysis cell of the kind disclosed in U.S. Pat. Nos. 2,951,793, 4,596,647, 4,880,506, 4,855,030 and 5,009,752, and pending application Ser. No. 08/267,949, filed Jul. 6, 1994, the disclosures of each of these patents and patent application being incorporated herein by reference and are generally indicative of the prior art in this field.

In such cells as disclosed in the above-mentioned patents and application, the spent nuclear fuel forms the anode or is dissolved in an anode pool. An electrolytic fuel cell is used, and the purified metal is transferred electrolytically and collected on the cathode. In other designs, an anode pool is located at the bottom of the cell, and the cathode may be located above the anode in the electrolyte pool. It has been found in the prior art that relatively pure uranium can be electrolytically deposited on a solid cathode and thereafter mixtures of uranium and plutonium can be deposited on a molten metal cathode such as of cadmium, see the above-identified U.S. Pat. No. 4,880,506. In all of the art cited above, and in the electrorefining process as it now exists, the anode is located no closer than about 9 inches from the cathode. This is the state of the art as it existed before the subject invention. It is understood that the electrical resistance of the cell is greatly influenced by the space between the anode and the cathode and the cell resistance is such that the limiting average electrical current is about 200 amperes in the current test cell at Argonne National Laboratory, for transport from the anode to the solid cathode for uranium collection and approximately 80 amperes for transfer to the liquid cathode such as of cadmium for the collection of a combination of plutonium and uranium. These current limits of prior art approaches restrict the transport and collection of the recoverable materials from spent nuclear fuel.

OBJECTS AND SUMMARY OF THE INVENTION

Accordingly, it is an object of the present invention to improve the collection efficiency of relatively pure uranium metal from spent nuclear fuel such as from a nuclear reactor by increasing the thruput rate in an electrorefining cell.

It is another object of the present invention to reduce electrical resistance in an electrorefining cell by increasing electrode surface area and reducing the space between the cell's anode and cathode to increase cell thruput of uranium metal recovered in the cell.

Yet another object of the present invention is to facilitate the collection efficiency of uranium in an electrochemical refining cell by trapping dendrites of uranium deposited on the lateral surface of a rotating cylindrical cathode.

A further object of the present invention is to provide an electrochemical refining cell having concentrically spaced, alternating cylindrical cathode and cylindrically-arrayed, spaced anode baskets containing spent nuclear fuel for improved transfer and enhanced thruput of the uranium from an anode to a cathode.

This invention contemplates a high-thruput electrode configuration for an electrorefining cell for the recovery of spent nuclear fuel employing parallel electrodes including a plurality of anodic dissolution baskets positioned within circular channels formed by concentric cathode cylinders. In an electrorefining cell having a diameter on the order of 8 inches, the present invention includes two concentric cathode cylinders and 12 anodic dissolution baskets, with 4 baskets disposed within an inner cathode cylinder and 8 baskets disposed intermediate the inner and an outer cathode cylinder. Increased electrode area is achieved in this design by the large number of anodic dissolution baskets and by employing the inner and outer surfaces of each of the concentric cylinders as the cathode area. Additional concentric cathode cylinders may be employed, with each additional concentric cylinder having a higher dissolution-electrodeposition rate than the inner, smaller diameter cylinders, where the thruput rate for the electrode assembly equals the sum of the thruput rate of each electrode pair. The rotating anodic dissolution baskets contain metallic pellets comprised of a mixture of metals including spent uranium and include scrapers for removing uranium from the walls of the concentric cathode cylinders for deposit in a collection basket for recovery. The parallel electrode/concentric cylinder cathode electrorefining cell configuration of the present invention increases uranium collection efficiency and throughput from the current rate of approximately 0.07 kg per hour to approximately 31.2 kg per hour.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4c is a sectional view taken along site line 4c—4c in FIG. 4a;

FIG. 5a is taken along site line 5a—5a in FIG. 5b;

DETAILED DESCRIPTION OF THE PREFERRED EMBODIMENTS

Figure 1:
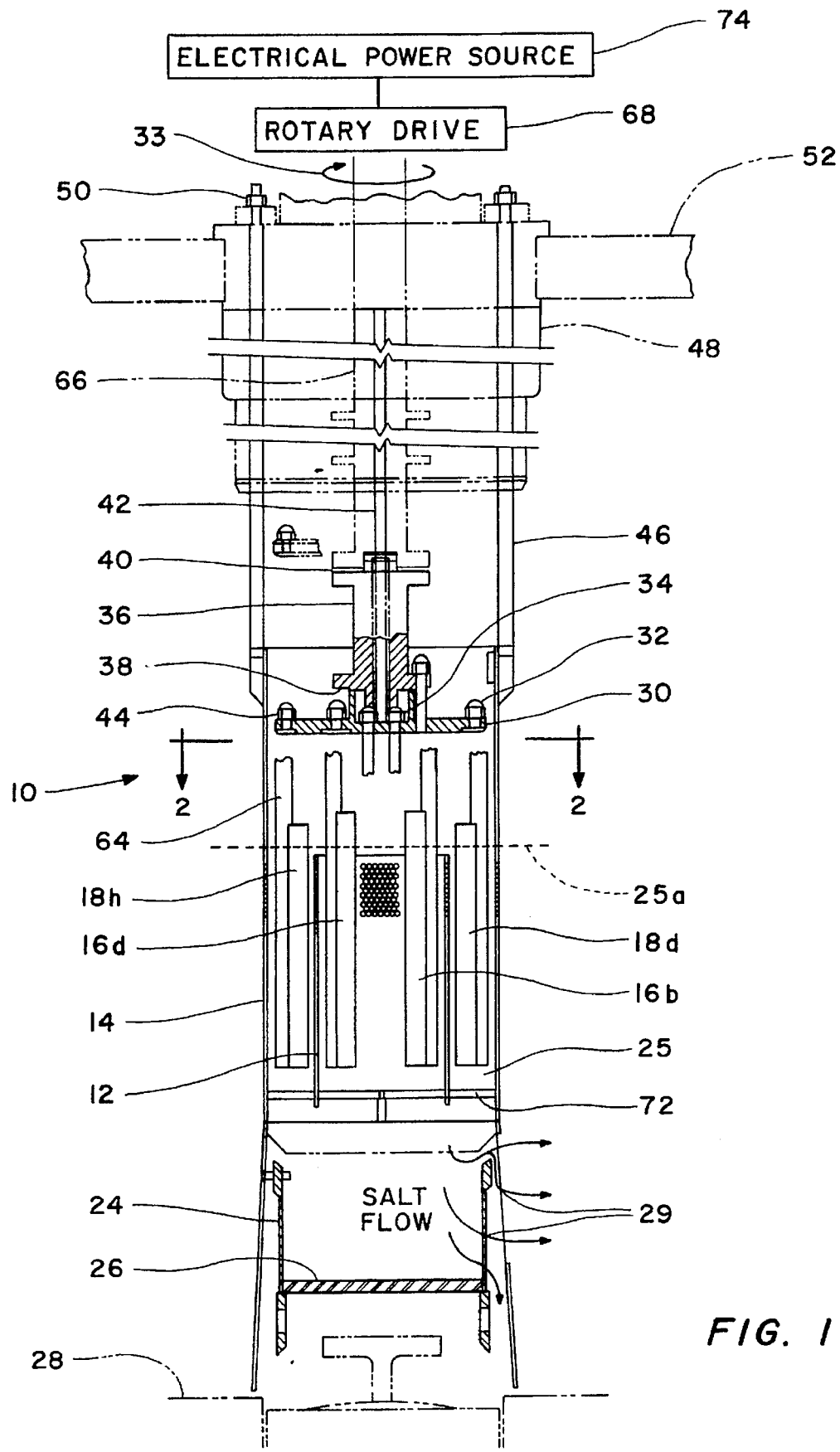
FIG. 1 is a longitudinal sectional view shown partially in phantom of a parallel electrode/concentric cylinder cathode arrangement for an electrorefining cell in accordance with the present invention.
Figure 2:
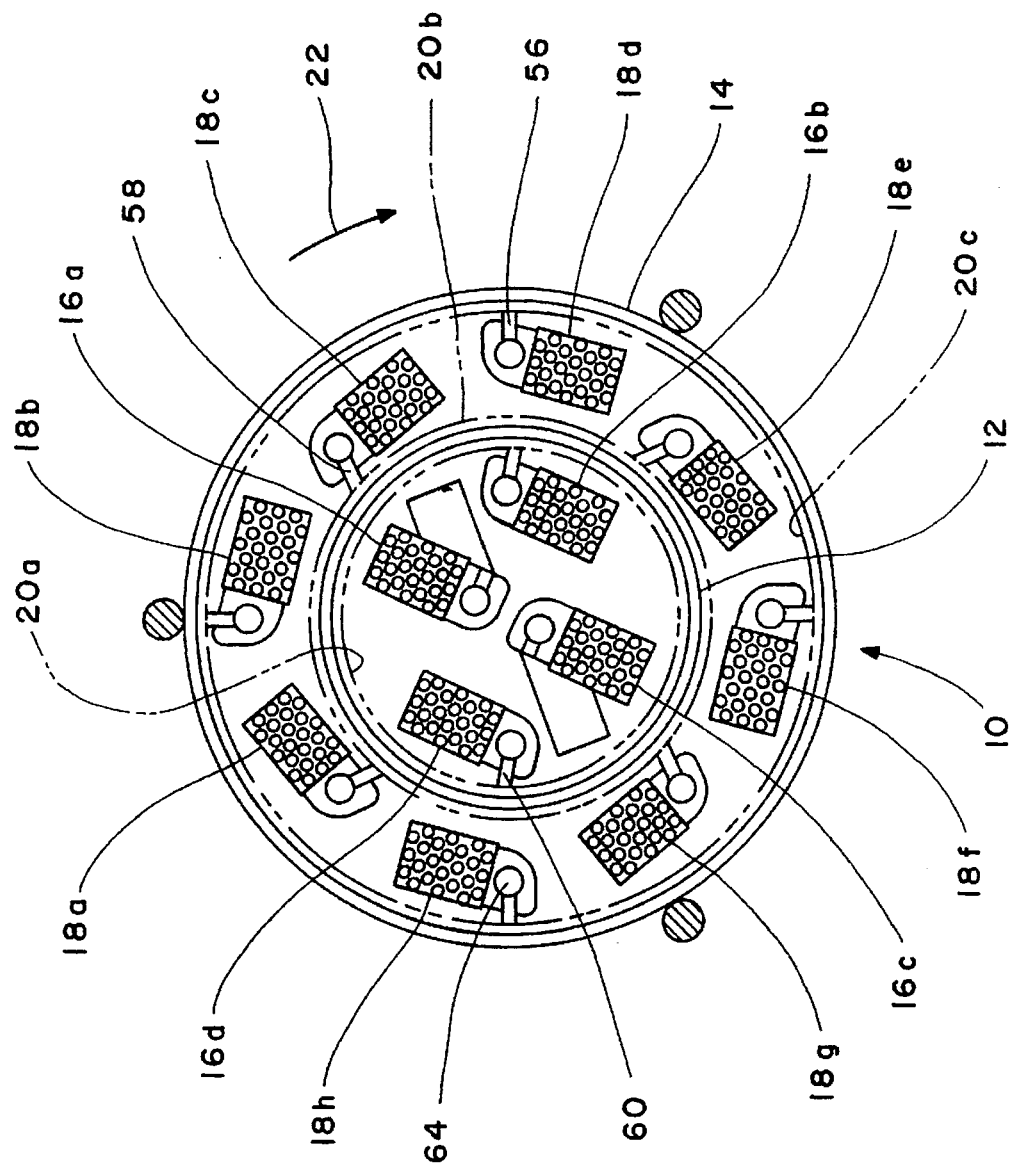
FIG. 2 is a sectional view of the electrorefining cell of FIG. 1 taken along site line 2—2 therein.

Referring to FIG. 1, there is illustrated a longitudinal sectional view shown partially in phantom of a parallel electrode/concentric cylinder cathode electrorefining cell 10 in accordance with the present invention. A cross sectional view of the electrorefining cell 10 of FIG. 1 taken along site line 2—2 therein is shown in FIG. 2.

The electrorefining cell 10 includes an outer cathode cylinder, or tube, 14. The outer cathode cylinder 14 is positioned on a support member 28 shown in dotted line form at the bottom of FIG. 1. Disposed in and below a lower portion of the outer cathode cylinder 14 is a reservoir 24 having a bottom portion 26.

In accordance with the present invention, concentrically disposed within the outer cathode cylinder 14 is an inner cathode cylinder 12. Each of the outer and inner cathode cylinders 14, 12 is maintained in a fixed position relative to each another and is preferably comprised of a suitable metal which may be a ferrous or a molybdenum alloy, as well known in the art. Disposed intermediate the outer cathode cylinder 14 and the inner cathode cylinder 12 and arranged in a spaced manner about the inner cathode cylinder are a plurality of outer anode baskets 18a–18h. Each of the outer anode baskets 18a–18h is attached to and supported by a respective support rod as shown for the combination of basket support rod 64 and outer anode basket 18h. Disposed within the inner cathode cylinder 12 are a plurality of spaced inner anode baskets 16a–16d. Each of the inner anode baskets 16a–16d is similarly coupled to and supported by a respective support rod within the inner cathode cylinder 12. Each of the aforementioned anode baskets is in the form of an apertured, or porous, container holding a spent nuclear fuel which has been fragmented.

Also disposed within the inner and outer cathode cylinders 12, 14 is an electrolyte 25 to a fill line indicated by dotted line 25a so that the inner and outer anode baskets are submerged in the electrolyte. Electrolyte 25 is preferably comprised of chloride salts and may include various of the alkali and alkaline earth metals. More preferably, it is the eutectic of lithium and potassium chloride which may also contain the chlorides of uranium and plutonium during operation of the electrorefining cell 10. The exact chemical make-up of the electrolyte 25 is well known and is to some extent dependent upon the cycle at which the cell is operating. For example, during some portion of the cell cycle, there will be cadmium chloride present and at other times it may not be present. In addition, as is understood, the plutonium to uranium ratio in the cell varies depending on which part of the operating cycle measurements are taken. The anode design is specifically adapted to enhance the flow of electrolyte through and around each of the anode baskets so as to provide intimate contact between the electrolyte 25 and the spent nuclear fuel disposed in each of the anode baskets as described below.

Each of the anode baskets is attached to and supported by its associated support rod as shown for the case of outer anode basket 18h and basket support rod 64. The upper end of each of the support rods is attached to a plate 30 by means of a respective threaded member 32. Support plate 30 is, in turn, coupled to and supported by a spool support member 36. Spool support member 36 is, in turn, attached to and supported by a rotary shaft 66 (shown in dotted line form) which is, in turn, rotationally displaced by means of a rotary drive unit 68 coupled thereto. Rotary drive unit 68 rotationally displaces the combination of shaft 66, spool support member 36 and basket support plate 30 in the direction of arrow 33. Rotation of the basket support plate 30 gives rise to a corresponding rotation of the inner and outer anode baskets 16a–16d and 18a–18h within the electrolyte 25 in the electrorefining cell 10. Conductive washers 38 and 40 are respectively disposed between the basket support plate 30 and spool support member 36 and between the spool support member 36 and rotating shaft 66. A voltage probe 42 is coupled to an electrical power source 74 and extends down through the rotating shaft 66, spool support member 36 and basket support plate 30 for applying a voltage to the anode baskets. The inner and outer cathode cylinders 12, 14 are similarly coupled to and charged by conventional means which are not shown for simplicity. A plurality of rods 46 are disposed about a heat shield 48 for attaching the heat shield to an upper end portion of the outer cathode cylinder 14. Each of the rods 46 is attached to a cover 52 of the electrorefining cell 10 by means of a respective nut 50. A guide plate, washer and nut/bolt combinations 44 are attached to and disposed on an upper surface of the basket support plate 30 for connecting the basket support rods thereto.

Figure 3A:
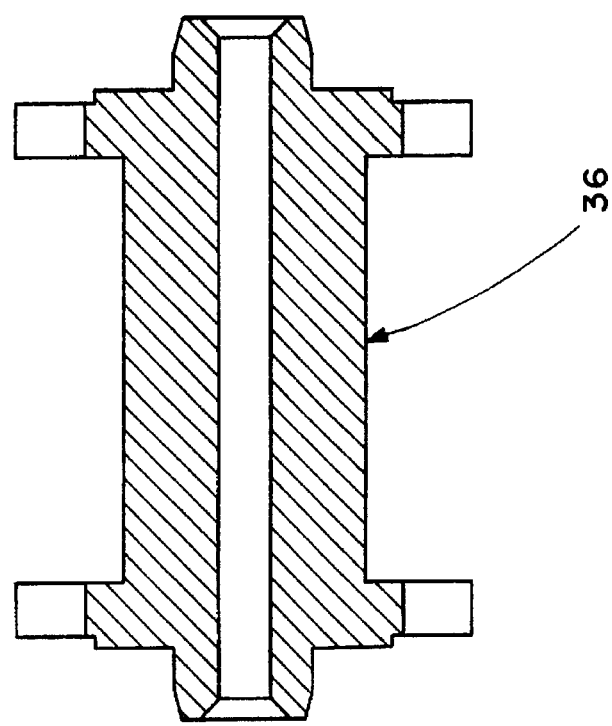
FIGS. 3a and 3b are respectively longitudinal sectional and end-on views of a spool support for use in the electrorefining cell of the present invention.
Figure 3B:
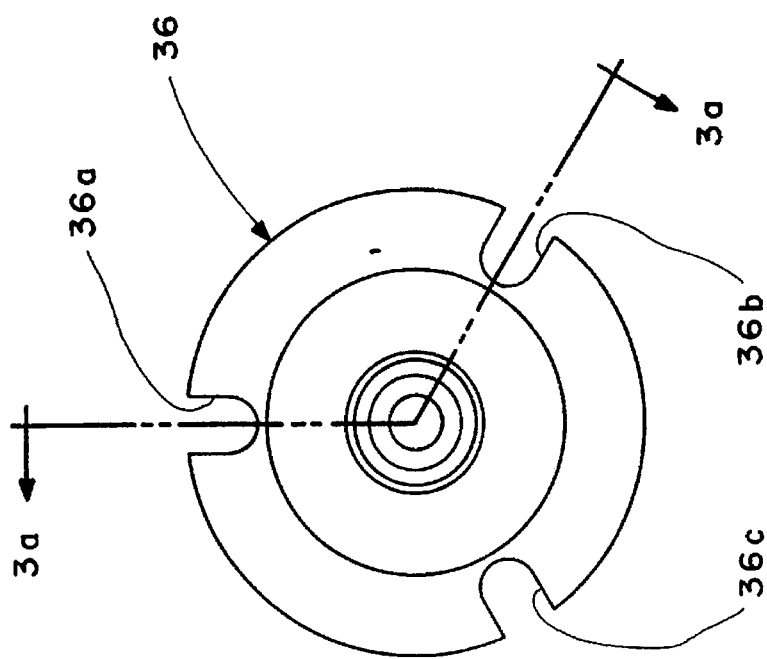

Longitudinal sectional and end-on views of the spool support member 36 are respectively shown in FIGS. 3a and 3b. Disposed about the outer periphery of the spool support member 36 on each opposed end thereof are three notches 36a, 36b and 36c for receiving nut and bolt combinations for attaching the spool support member to the basket support plate 30 as well as to the rotating shaft 66.

Figure 4A:
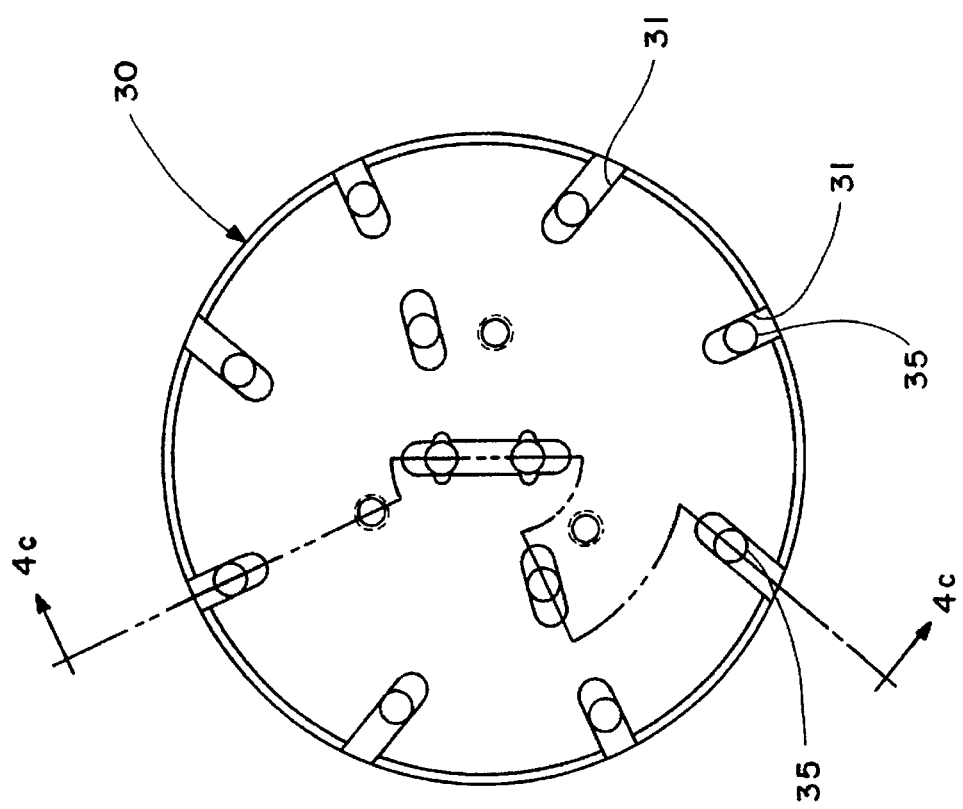
FIGS. 4a, 4b and 4c are respectively front end, aft end and sectional views of a basket support plate for use in the electrorefining cell of the present invention, where
Figure 4B:
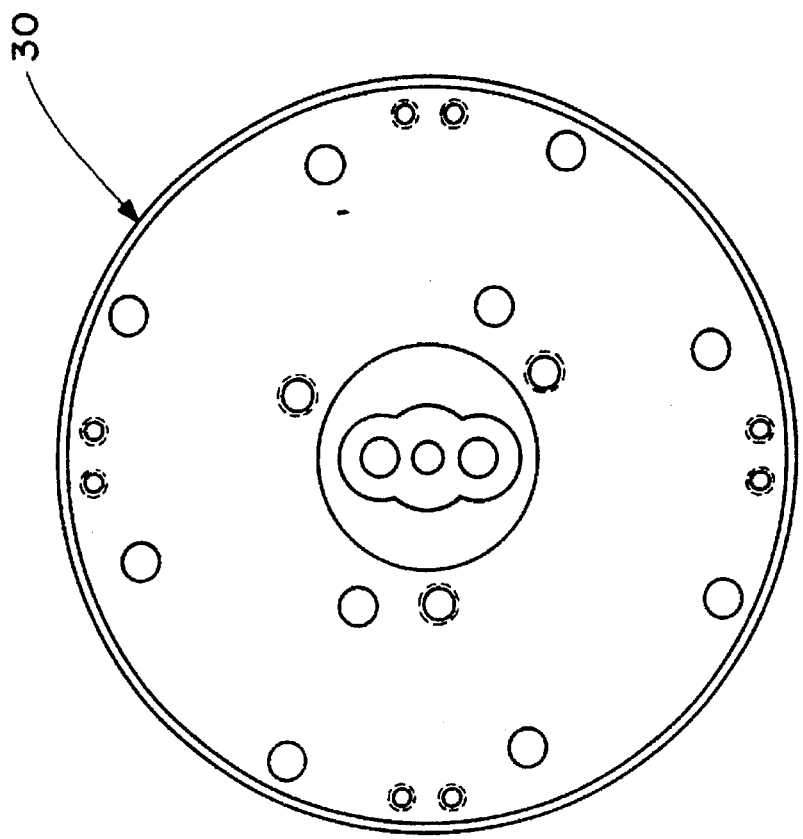
Figure 4C:
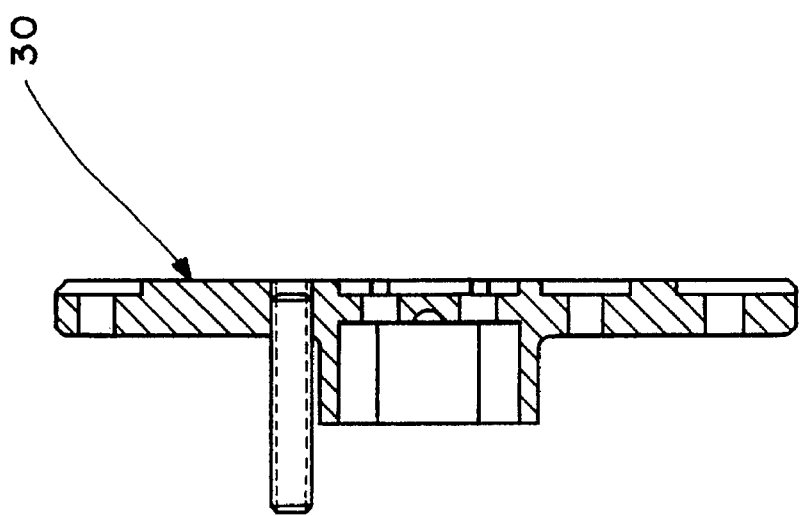

Referring to FIGS. 4a, 4b and 4c, there are respectively shown front end, aft end and sectional views of the basket support plate 30 of the electrorefining cell 10. The basket support plate 30 includes a plurality of spaced slots 31 for receiving an upper end of each of the basket support rods 64 as shown in FIG. 4a.

Figure 5A:
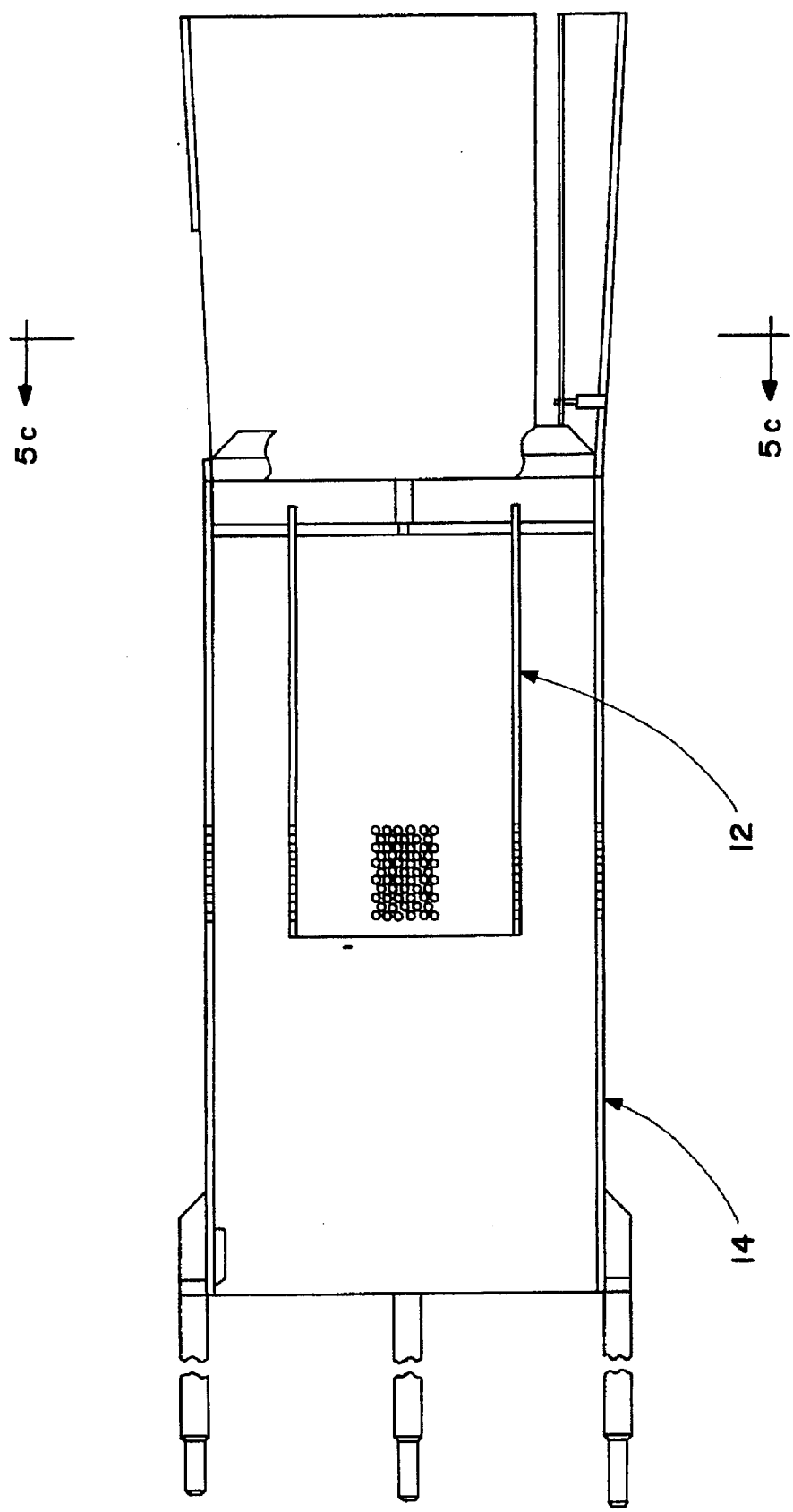
FIGS. 5a, 5b and 5c are respectively longitudinal sectional, front end and aft end views of a cathode tube for use in the electrorefining cell of the present invention, where
Figure 5B:
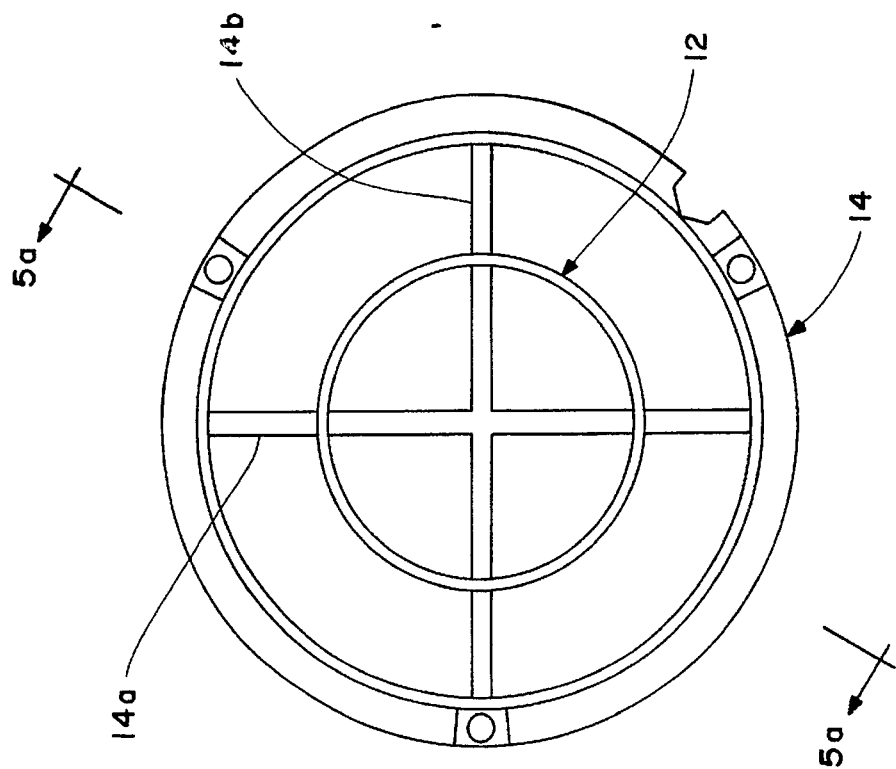
Figure 5C:
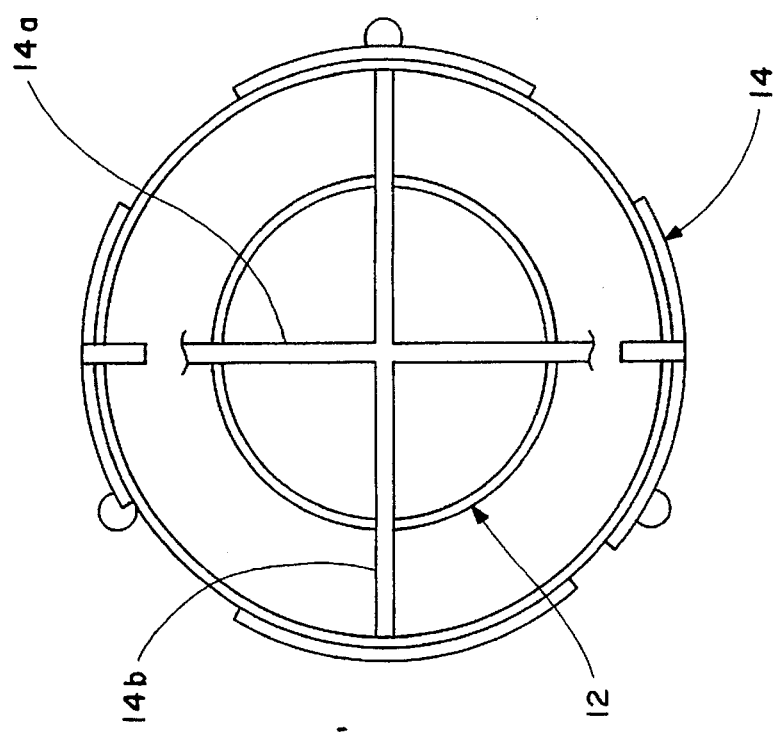

Referring to FIGS. 5a, 5b and 5c, there are respectively shown longitudinal sectional, front end and aft end views of the cathode arrangement in the electrorefining cell of the present invention, including the inner cathode cylinder 12 and the outer cathode cylinder 14. Disposed in a lower portion of the outer cathode cylinder 14 are a pair of transversely oriented first and second notched cross members 14a and 14b. The inner cathode cylinder 12 is adapted for positioning in the notches in the first and second cross members 14a, 14b for securely maintaining the inner cathode cylinder in fixed position within the outer cathode cylinder 14.

Figure 6A:
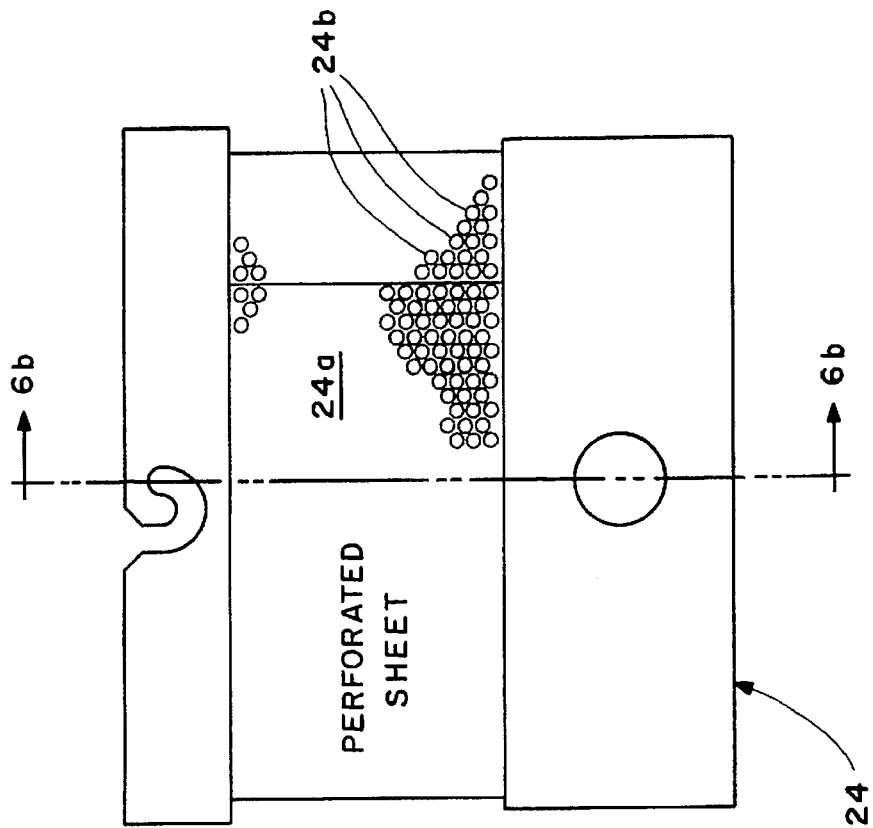
FIG. 6a is a side elevation view shown partially in phantom of an anode reservoir for use in the electrorefining cell of the present invention.
Figure 6B:
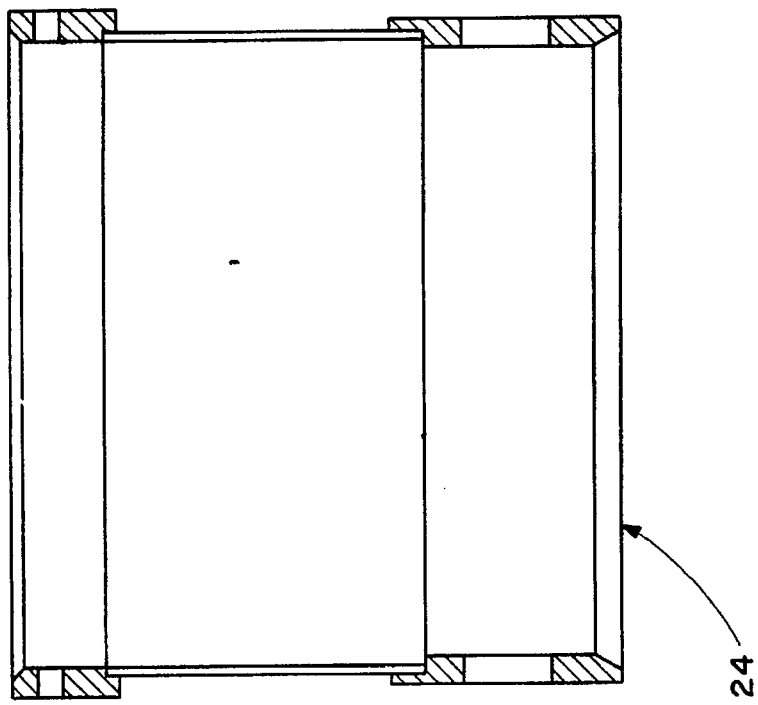
FIG. 6b is a sectional view of the anode reservoir of FIG. 6a taken along site line 6b—6b therein.

Referring to FIGS. 6a and 6b, there are respectively shown side elevation and sectional views of an anode reservoir 24 for use in the inventive electrorefining cell 10. Each anode reservoir 24 includes a perforated sheet 24a disposed about an intermediate, outer portion of the reservoir. The perforated sheet 24a includes a plurality of spaced holes 24b as shown in FIG. 6a to allow for salt flow out from the reservoir in a lower portion of the electrorefining cell 10 in the direction of arrows 29 in FIG. 1.

Each anode basket is provided with a scraper element disposed on a lateral portion thereof and extending substantially the entire length of the anode basket. Thus, for example, outer anode basket 18d is provided with scraper element 56. During operation, uranium from the spent nuclear fuel disposed in each of the outer anode baskets 18a–18h is deposited via electrolyte 25 on the inner surface of the outer cathode cylinder 14 in the form of an inner layer 20c. Similarly, uranium from spent nuclear fuel in the outer anode baskets 18a–18h is also deposited in the form of a layer 20b on the outer surface of the inner cathode cylinder 12. In like manner, uranium from spent nuclear fuel disposed within the inner anode baskets 16a–16d travels via electrolyte 25 and is deposited on the inner surface of the inner cathode cylinder 12. As the outer anode baskets 18a–18h are rotationally displaced as previously described, a scraper element, such as scraper element 56 on anode basket 18d, on each basket engages and removes uranium in the form of dendrites from either the inner surface of the outer cathode cylinder 14 or from the outer surface of the inner cathode cylinder 12. For example, scraper elements such as scraper element 58 on anode basket 18c engage the outer surface of the inner cathode cylinder 12 and remove the uranium layer 20b therefrom. The layer of uranium 20a on the inner surface of the inner cathode cylinder 12 is removed by a plurality of scraper elements, such as scraper element 60 on inner anode basket 16d. Thus, as uranium is deposited on the inner surface of the outer cathode cylinder 14 as well as on the inner and outer surfaces of the inner cathode cylinder 12, the scraper elements disposed on each of the anode baskets scrape the deposited uranium material from the cathode walls. The thus removed uranium material collects on a bottom screen 72 in a lower portion of the electrorefining cell's crucible for subsequent removal. The lithium halide salt electrolyte 25 flows through the bottom screen 72 and out of the electrorefining cell's crucible in the direction of arrows 29 and is then pumped back into an upper portion of the electrorefining cell in a circulating manner.

There has thus been shown an electrorefining cell for use in the recovery of spent nuclear fuel which includes a first plurality of inner and a second plurality of outer anodic dissolution baskets containing spent nuclear fuel and arranged in generally circular, concentric arrays. The electrorefining cell further includes hollow, cylindrical-shaped inner and outer cathodes, where the inner hollow cathode is concentrically disposed about the inner anodic dissolution baskets and the outer hollow cathode as concentrically disposed about the outer anodic dissolution baskets. The anodic baskets and cathodes are submerged in a molten lithium halide salt. Uranium placed in the anode baskets is transferred via the lithium halide salt to the cathodes and collects on the surfaces of the cathodes in the form of dendrites. The uranium dendrites are scraped from the surfaces of the cathodes by scraper elements on each of the anode baskets, with the thus removed uranium deposits falling to a lower portion of the electrolytic cell for recovery. Each of the dissolution baskets may be rotationally displaced for allowing its respective scraper element to engage an adjacent cathode and remove the deposited uranium therefrom. Cell resistance is reduced and uranium collection efficiency enhanced by increasing the electrode area and reducing the anode-cathode spacing for enhanced trapping and recovery of the uranium dendrites scraped off of the cylindrical cathodes. While disclosed in terms of a pair of inner and outer anodic dissolution baskets and a pair of inner and outer hollow, cylindrical-shaped cathodes, the present invention contemplates virtually any number of concentrically arranged, alternating anodic dissolution basket arrays and hollow, cylindrical-shaped cathodes.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A combination of anodes and cathodes for an electrorefiner comprising:

a first plurality of anode baskets;

a first inner cylindrical cathode concentrically disposed about and in closely spaced relation to said first plurality of anodes;

a second plurality of anode baskets concentrically disposed about and in closely spaced relation to said first inner cathode;

said first and second plurality of anode baskets adapted to contain a spent nuclear fuel;

said anodes and cathodes adapted to be surrounded by a molten salt; and a second outer cylindrical cathode concentrically disposed about and in closely spaced relation to said second plurality of anodes.

2. The combination of claim 1 further comprising means for providing relative movement between said first and second pluralities of anode baskets and said first inner and second outer cathodes.

3. The combination of claim 2 wherein said means for providing relative movement includes a plurality of support rods each coupled to a respective anode basket and further coupled to rotary drive means for rotationally displacing each of said anode baskets.

4. The combination of claim 3 wherein each of the anode baskets extends axially in an annular region between said cylindrical cathodes for rotation with respect to said cathodes.

5. The combination of claim 4 further comprising a generally circular support plate coupling said rotary drive means to each of said support rods.

6. The combination of claim 1 wherein each of said anode baskets includes a metal scraper element for engaging an adjacent surface of a cylindrical cathode for removing uranium deposited thereon.

7. The combination of claim 1 further comprising additional cylindrical cathodes and pluralities of anode baskets disposed concentrically about said second outer cylindrical cathode and arranged in an alternating manner proceeding radially outward from said first and second cathodes and said first and second pluralities of anode baskets.

8. An electrolytic cell for refining a spent nuclear fuel comprising:
   a first plurality of anode baskets;
   a first inner cylindrical cathode concentrically disposed about and in closely spaced relation to said first plurality of anodes;
   a second plurality of anode baskets concentrically disposed about and in closely spaced relation to said first inner cathode;
   said first and second plurality of anode baskets adapted to contain a spent nuclear fuel;
   a second outer cylindrical cathode concentrically disposed about and in closely spaced relation to said second plurality of anodes;
   said anodes and cathodes adapted to be surrounded by a molten salt; and
   displacement means of providing relative movement between said anodes and said cathodes;
   electrical power means selectively connected to said anodes and to said cathodes for providing electrical power to the cell; and
   porous means disposed adjacent a lower portion of said cathodes for retaining metal from the spent nuclear fuel which is deposited on and falls from said cathodes during operation of the cell.

9. The electrolytic cell of claim 8 further comprising a means for providing relative movement between said first and second pluralities of anodes and said first and second cathodes.

10. The electrolytic cell of claim 9 wherein said means for providing relative movement includes a plurality of support rods each coupled to a respective anode and further coupled to rotary drive means for rotationally displacing each of said anodes.

11. The electrolytic cell of claim 10 wherein each of said anodes includes a porous container extending axially in an annular region between said cylindrical cathodes for rotation with respect to said cathodes.

12. The electrolytic cell of claim 11 further comprising a generally circular support plate coupling said rotary drive means to each of said support rods.

13. The electrolytic cell of claim 8 wherein each of said anodes includes a metal scraper element for engaging an adjacent surface of a cylindrical cathode for removing uranium deposited thereon.

14. The electrolytic cell of claim 8 further comprising additional cylindrical cathodes and pluralities of anodes concentrically disposed about said second outer cylindrical cathode and arranged in an alternating manner and proceeding radially outward from said first and second cathodes and said first and second pluralities of anodes.

\* \* \* \* \*